UNITED STATES PATENT OFFICE.

EUGEN LANGEN, OF COLOGNE, PRUSSIA.

IMPROVEMENT IN THE MANUFACTURE OF HARD SUGAR.

Specification forming part of Letters Patent No. 151,602, dated June 2, 1874; application filed May 15, 1874.

CASE A.

*To all whom it may concern:*

Be it known that I, EUGEN LANGEN, of Cologne, in the Kingdom of Prussia, have invented an Improvement in the Manufacture of Hard Sugar, of which the following is a specification:

This invention consists in a novel process of making hard sugar by subjecting the sugar mass, while in the molds into which it has been run from the vacuum-pan and allowed to crystallize and cool, first, to a purging action of the centrifugal machine for the purpose of expelling the green sirup; then removing said molds with their contents, and separately treating the mass in said molds to the white or claying liquor, by forcing the latter up through the sugar mass; and subsequently, and by a separate operation, expelling, by centrifugal machine, the cleansing-liquor from the mass in said molds.

This process differs from that for which Letters Patent No. 134,682 were issued to me January 7, 1873, in one very important respect, namely, by dispensing with a vacuum tank or tanks for claying the sugar mass in the molds, and, instead of running the claying-liquor down through the mass, forcing the white cleansing or claying liquor, by hydrostatic, hydraulic, or other pressure, up through the mass in the molds, whereby much difficulty and complication attendant upon establishing a vacuum in connection with the molds are avoided, and the thorough permeation of the sugar mass by the claying-liquor is more perfectly accomplished and clearly indicated; also, a more free escape established for the air in the sugar mass within the molds.

The advantages otherwise of this process are similar to those described in the process previously patented by me, as hereinbefore referred to.

The following is a more minute description of my improved process:

The sugar mass, after being boiled in the vacuum-pan, is filled into molds of a suitable construction, essentially as in my former patent, but preferably having their removable bottoms secured, as described in a separate application for Letters Patent made by me simultaneously with this. The sugar mass is then allowed to stand in said molds for a necessary length of time—say, from sixteen to twenty-four hours—to effect a further crystallization of the sugar mass in the molds, and thorough cooling of the same. After the whole mass has thus been hardened and cooled, the molds, with their contents, are placed in the centrifugal machine to free the mass from adhering green sirup, said previously-filled molds forming a close inner wall, open on their outer and inner faces. After the green sirup has been separated by the centrifugal machine from the sugar mass in the molds said machine is stopped, and the molds containing the partly-cleansed sugar taken out of the machine, placed in a suitable and separate apparatus—or, in other words, on a liquoring-table—an advantageous construction of which is also made the subject of a separate application for patent by me simultaneously with this, and on which the sugar in the molds is clayed by forcing, by hydrostatic, hydraulic, or other pressure, the white claying or cleansing liquid up through the mass in the molds, whereby the mass may be more perfectly and surely cleansed than if the claying-liquor were expelled by atmospheric pressure, as against a vacuum, and the thorough cleansing of the same is more readily and clearly indicated or seen; and, by properly arranging the molds with their larger faces or sides uppermost, the clearance of the green sirup, by the claying-liquor passing upward instead of running down through the mass, is more effectually secured, and a more free escape established for the air in the sugar mass within the molds.

To free the sugar mass from the cleansing or claying liquor, the molds containing the sugar mass, impregnated with the claying-liquor, are placed within the same, or another centrifugal machine, that is then set in motion to purge the claying-liquor from the mass, together with any green sirup. The cleansing operation can be repeated as often as desired.

During all these distinct operations the sugar mass, as also in my former invention, is not taken out of the molds or boxes into which it was originally filled from the vacuum-pan to crystallize and cool, and the several operations under the process are completed separate, the one from the other.

I claim—

The process, substantially as herein described, of manufacturing hard sugar by first subjecting the sugar mass, while in the molds into which it has been run from the vacuum-pan and allowed to crystallize and cool, to a purging action of the centrifugal machine, for the purpose of expelling the green sirup, then removing said molds with their contents, and separately treating the mass in said molds to the white liquor or cleansing agent by forcing the latter in an upward direction through the mass by hydrostatic, hydraulic, or other pressure, and independent of a vacuum applied to the molds through the mass, and subsequently, and by a separate operation, expelling, by centrifugal machine, the cleansing-liquor from the mass in the same molds.

EUGEN LANGEN.

Witnesses:
ALB. LANGEN,
C. KURTZ.